United States Patent [19]
Kralowetz et al.

[11] 3,850,022
[45] Nov. 26, 1974

[54] SWAGING MACHINE FOR A CONTINUOUS SWAGING OF ELONGATED WORKPIECES

[75] Inventors: Bruno Kralowetz; Gottfried Blaimschein, both of Steyr, Austria

[73] Assignee: Fried. Krupp Huttenwerke AG, Bochum, Germany

[22] Filed: Apr. 13, 1973

[21] Appl. No.: 350,738

[30] Foreign Application Priority Data
May 3, 1972 Austria .............................. 3822/72

[52] U.S. Cl. ................................................. 72/426
[51] Int. Cl. ............................................ B21d 43/08
[58] Field of Search ............ 72/426, 402, 403, 404, 72/407, 405, 406, 452

[56] References Cited
UNITED STATES PATENTS
927,514   7/1909   Eden .................................... 72/426
3,621,702  11/1971  Kralowetz ............................ 72/452

*Primary Examiner*—C. W. Lanham
*Assistant Examiner*—Gene P. Crosby
*Attorney, Agent, or Firm*—Kurt Kelman

[57]  ABSTRACT

A swaging box has a workpiece entrance and a workpiece exit defining opposite ends of a path on which a workpiece can travel through said box. At least two dies are mounted in said box and operable to blow at the same time on a workpiece longitudinally extending on said path and to oscillate so as to impart to said workpiece an advance along said path. A set of feed rollers precede said workpiece entrance. A set of feed rollers succeed said workpiece exit. Said sets of feed rollers are arranged to engage a workpiece longitudinally extending on said path and operable to control the travel of said workpiece along said path independently of said advance imparted to said workpiece by the oscillation of said dies.

4 Claims, 5 Drawing Figures

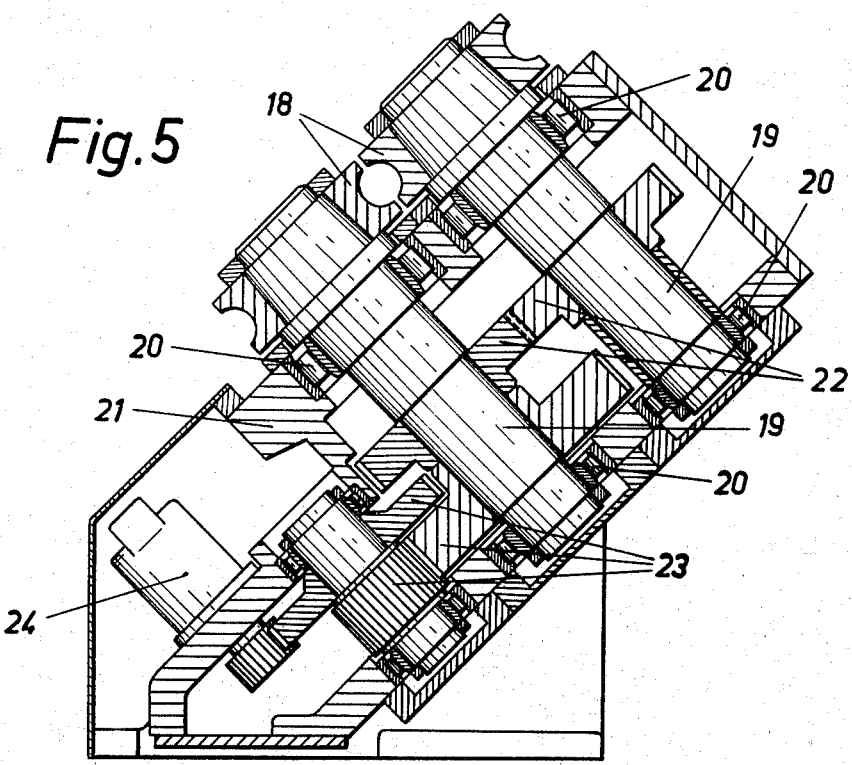
Fig.5
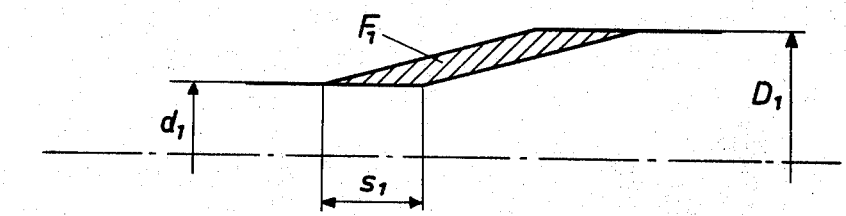
Fig.1
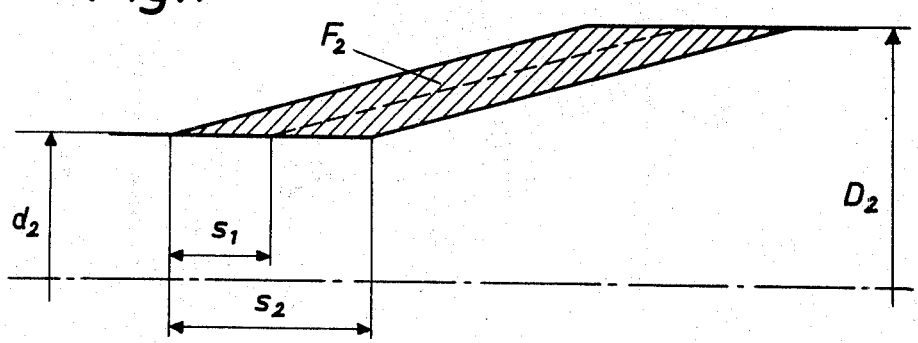

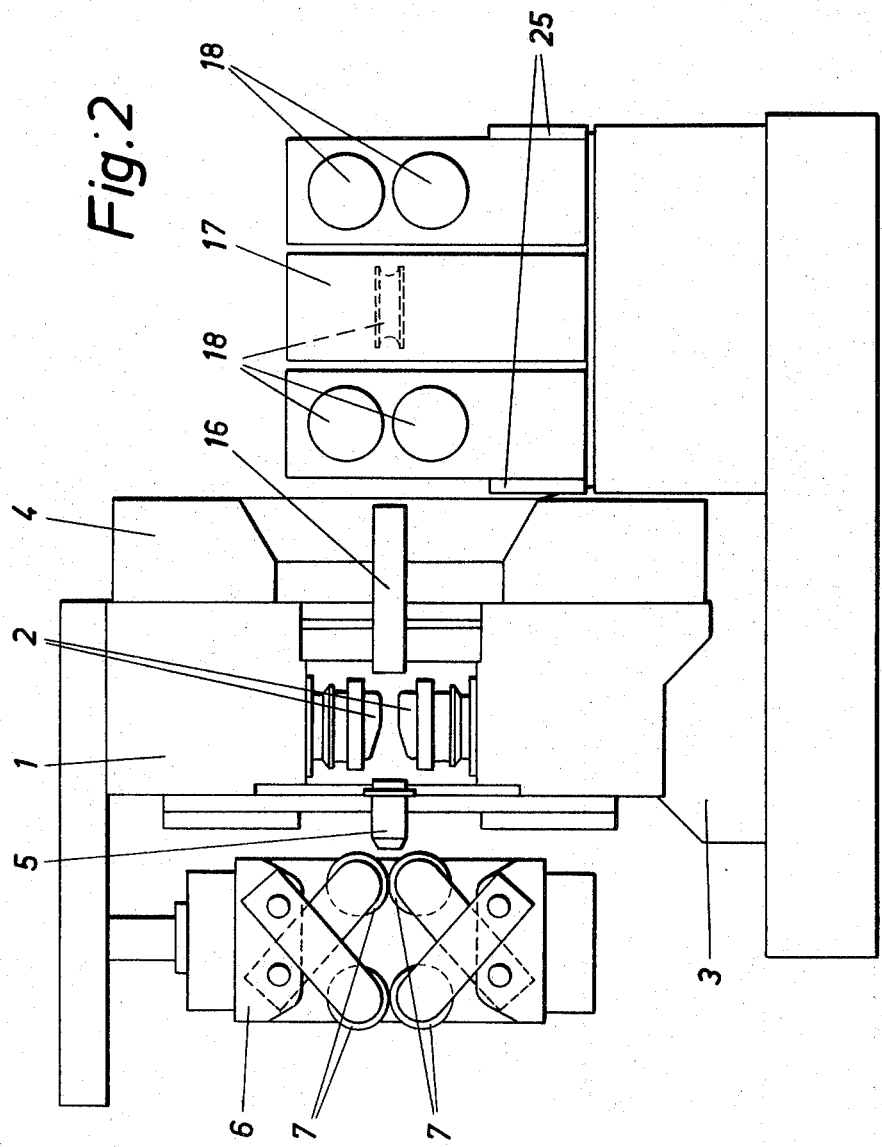

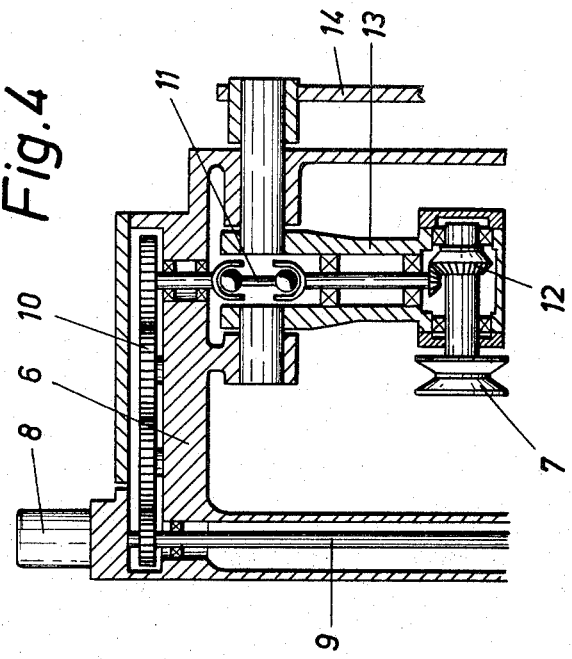
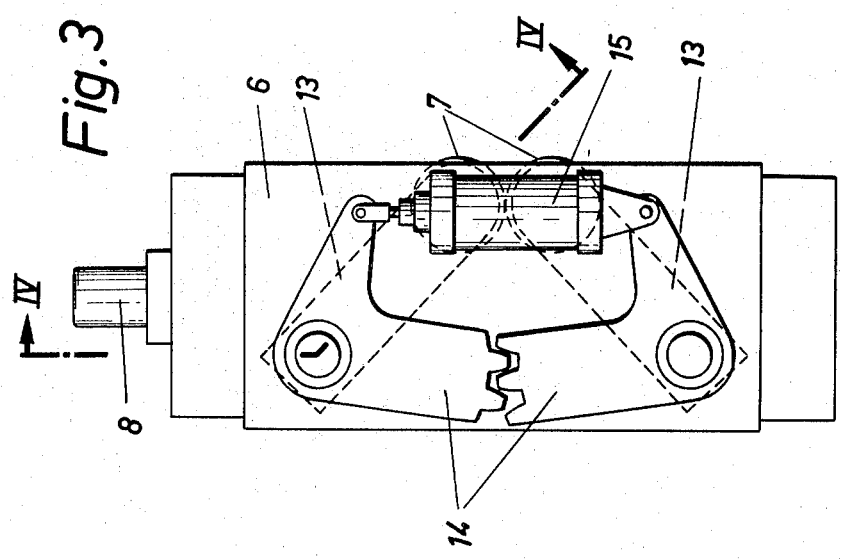

SWAGING MACHINE FOR A CONTINUOUS SWAGING OF ELONGATED WORKPIECES

This invention relates to a swaging machine for a continuous swaging of continuous or rod-shaped workpieces, which machine comprises at least two dies which blow at the same time and during such blow oscillate in the longitudinal direction of the workpiece.

In continuous swaging, the maximum reduction and the volume deformed by each die blow depend on the nature of the material to be shaped and on the number of dies which blow at the same time. For each machine, there is a maximum with which an optimum swaging effect is produced. These values, which depend on the swaging machine itself, can be determined for workpieces having a given size and given final dimensions. In order to produce similar results with workpieces which differ in size and to enable a swaging to different final dimensions and a working through to an equally good degree, the reduction, i.e., the ratio of the diameters of the workpiece before and after the swaging operation, must be the same for all workpieces to be swaged, and the cross-sections of the volumes shaped per die blow must be similar in configuration. For this reason, when a workpiece which is large in diameter is swaged to a final dimension which has the same relation to said diameter (constant reduction), the length of that workpiece portion which is to be machined with each die blow must be correspondingly increased so that the shaped cross-sections are similar in configuration and the desired optimum swaging effect is produced.

When the dies are changed to alter their stroke position and penetration, the same reduction can be obtained with workpieces which differ in diameter and are to be swaged to the same final dimensions, and the extent to which the workpiece is moved per die blow can be varied either by a variation of the feed rate whereas the dies blow at the same frequency, or by a variation of the frequency at which the dies blow whereas the feed rate remains the same.

In the previously disclosed swaging machines, difficulties are involved in a change of the extent of the movement of the workpiece per die blow. Theoretically, the frequency at which the dies blow can be increased or decreased whereas the speed of travel of the workpiece remains the same, but in practice this can be accomplished only with difficulty because an uneconomical structural expenditure would be involved as the swaging machine would have to be driven by controllable d.c. motors. In swaging machines of the kind defined first hereinbefore, it is not possible readily to change the feed rate of the workpiece whereas the frequency at which the dies blow remains the same, because the advance is imposed on the workpiece by the oscillating movement of the dies and this oscillation imparted by the eccentric drive means is directly related to the velocity of the radial reciprocation of the dies. The feed rate cannot be varied independently of the frequency of the blows but only in a certain relation thereto and even this can be effected only by a relatively complicated change of the various lever lengths, eccentrics, or the like.

For this reason it is an object of the invention to eliminate these disadvantages and to provide a continuous swaging machine which comprises oscillating dies and in which the feed rate of the workpiece can be varied virtually independently of the oscillation of the dies so that additional advantages and improvements can be obtained.

This object is essentially accomplished according to the invention in that sets of feed rollers are provided before the workpiece entrance and behind the workpiece exit of the swaging box and these rollers control the feed rate of the workpiece independently of the advance imposed to the workpiece by the oscillating dies. The workpiece is firmly gripped by the sets of feed rollers and is moved by them through the swaging box at a velocity which depends on the speed of the feed rollers. The means for driving the feed rollers are so flexible as to take up and equalize the movements which are imposed on the workpiece by the dies as the latter contact the workpiece. As soon as the dies have disengaged the surface of the workpiece, the workpiece can be accelerated or retarded independently of the die movement. As a result, the feed rollers impose on the workpiece an advance which is superimposed on the advance imposed by the oscillation of the dies so that the resulting overall feed rate is variable within wide limits. The extent of the movement which can be imparted to the workpiece per die blow can now be changed with relatively simple means so that one and the same swaging machine can be operated to provide highly different final dimensions in conjunction with an equally good swaging effect. When the sets of feed rollers are inoperative, the swaging machine will operate without such rollers, just as any other swaging machine, but then the feed rate cannot be varied as easily as before because the speed of travel depends only on the oscillatory movement of the dies. To prevent in this case an overload of the machine, the advance imposed by the oscillating dies is effected at a speed which is in the lower range of the speed of travel so that the sets of feed rollers serve only to accelerate the workpiece when the dies are disengaged therefrom. Another advantage of the feed rollers provided according to the invention resides in that the sets of drive rollers render the overall advance more uniform. This is significant as regards the power requirement and the quality of the swaged product.

It will be particularly desirable to provide rocker arms which are coupled to move in opposite senses and which carry the feed rollers which are arranged opposite to each other, and to provide a pressure fluid actuator for controlling the spacing of said opposite feed rollers. In this case, the feed rollers need not be changed whenever a swaged product having a new final dimension is desired but one and the same set of feed rollers can be used to center workpieces having certain initial and final dimensions exactly on the center line of the machine and to vary the speed of travel of the workpiece accordingly.

In a development of the invention, the exit feed rollers serve as sizing rollers. In this case a plurality of pairs of rigidly mounted rollers are arranged one behind the other and are connected to infinitely variable drive means, and adjacent ones of said rollers are angularly spaced 90° apart. When good tolerances of the deformed product are particularly important, then swaging alone will not be sufficient and the swaged workpiece must be sized in a separate operation. Because sets of rollers are arranged before and behind the swaging box and the exit rollers are used as sizing rollers, the swaging machine according to the invention enables a sizing operation to be performed immediately after the swaging operation so that the required accuracy can be provided virtually in a single operation. For this reason, the sizing rollers must be rigidly mounted, of course, so that they can deform the surface of the workpiece when this is required. Given sizing rollers can be used only for a single dimension and must be replaced for a shaping of workpieces having different dimensions. For a really satisfactory sizing, a plurality of pairs of rollers are arranged one behind the other, adjacent ones of these pairs are angularly spaced 90° apart, and these pairs of rollers can be driven at infinitely variable speeds so that the different speeds of travel of the workpiece can be taken into account.

To enable a production of swaged workpieces having a particularly high surface finish and particularly close final dimension tolerances, the invention teaches to provide a vibrator for imparting high-frequency vibrations to the sizing rollers. Because high-frequency vibrations can be imparted to the sizing rollers, the sizing can be effected without the so-called stick-slip effect, which results in vibrations due to friction. Such vibrations due to friction are self-excited vibrations which are caused by the difference between the larger frictional force which is effective when the movement is initiated and the smaller force of friction which is effective during the subsequent sliding movement. This difference may result in an intermittent or tottering motion, which would adversely affect the quality of the product. This is prevented by a vibration of the sizing rollers because such vibration will prevent a purely static friction and enables a maintenance of constant friction forces as the workpiece is pulled through the rollers.

The subject matter of the invention is shown by way of example on the accompanying drawings, in which FIG. 1 is a diagrammatic view showing the cross-sections of the deformed portions of two workpieces which differ in initial size.

FIG. 2 is a side elevation showing a continuous swaging machine according to the invention. For the sake of clearness, the feed rollers, the swaging dies, and the sizing rollers are shown in a position in the plane of the drawings after they have been turned through 45°.

FIG. 3 is an elevation showing on a larger scale part of the feed roller arrangement.

FIG. 4 is a sectional view taken on line IV—IV in FIG. 3 and

FIG. 5 is a transverse sectional view showing on a larger scale the sizing arrangement.

To enable a shaping of workpieces having different final dimensions $d_1$, $d_2$ with equally good results, i.e., so that they are worked through to the same degree, each of these swaging operations must result in the same reduction or the ratio of the initial diameter $D_1$, $D_2$ to the final dimension $d_1$, $d_2$ must always be the same, regardless of the initial size and of the final size. In addition to the constant reduction, another requirement for a constant quality of the swaged product resides in that the shaped volumes per die blow must have similar cross-sectional configurations $F_1$, $F_2$ in workpieces having different dimensions. In practice, this requires that the step $s_1$ performed by the workpiece per die blow must be varied in dependence on the size of the workpiece and must be increased to $s_2$ when a workpiece having a larger diameter $D_2$ is to be swaged so that the cross-sectional configurations $F_1$, $F_2$ are similar.

To increase or decrease the step performed by the workpiece per die blow, the speed of travel of the workpiece is changed whereas the frequency at which the dies blow is maintained constant.

The continuous swaging machine according to the invention has a conventional swaging box 1, which includes dies 2 that oscillate in the longitudinal direction of the workpiece. The machine also comprises a corresponding foundation 3 and a gearbox 4. The workpiece entrance 5 of the swaging box is preceded by a feed roller arrangement 6, which comprises a set of feed rollers 7. These feed rollers are driven by a hydraulic fluid drive 8, a synchronizing shaft 9, a spur gear train 10, a universal-joint shaft 11 and bevel gearing 12. Two pairs of mutually opposite feed rollers 7 are mounted on rocker arms 13, which by means of bell crank levers 14 provided with meshing teeth are coupled to move in opposite directions. The distance between the rollers 7 is adjustable by a pressure fluid actuator 15. In this arrangement, the feed rollers 7 can be adjusted to any workpiece and the same set of feed rollers can be used for different initial and final dimensions without need for a change of individual rollers.

The workpiece exit 16 of the swaging box is succeeded by a sizing arrangement 17, which comprises a plurality of pairs of rollers 18, adjacent pairs of rollers being angularly spaced 90° apart. The sizing rollers 18 are mounted on shafts 19, which are rigidly mounted with rolling-element bearings 20 in a suitable housing 21 so that the sizing rollers 18 can perform the required surface-finishing operation. To ensure an exact synchronism of the feed rollers which belong together, they are interconnected by synchronizing gears 22 also mounted on the shafts 19 and the rollers are jointly driven by a hydraulic fluid drive 24 through the intermediary of a gear train 23 at an infinitely variable speed.

In addition to the sizing arrangement 17, a vibrator 25 is provided, which imparts high-frequency vibration to the sizing rollers 18 and thus permits a particularly good surface finish and close tolerance to be achieved.

What is claimed is:

1. A swaging machine for a continuous swaging of elongated workpieces, which comprises a swaging box having a workpiece entrance and a workpiece exit defining opposite ends of a path on which a workpiece can travel through said box, at least two dies which are mounted in said box and operable to blow at the same time on a workpiece longitudinally extending on said path and to oscillate so as to impart to said workpiece an advance along said path, a set of feed rollers preceding said workpiece entrance, and a set of feed rollers succeeding said workpiece exit, said sets of feed rollers being arranged to engage a workpiece longitudinally extending on said path and operable to control the travel of said workpiece along said path independently of said advance imparted to said workpiece by the oscillation of said dies.

2. A swaging machine as set forth in claim 1, in which said preceding feed rollers comprise pairs of feed rollers disposed opposite to each other, the feed rollers of each of said pairs are mounted on respective rocker arms, said rocker arms associated with each pair of feed rollers are coupled to move in mutually opposite directions, and
a pressure fluid actuator is provided to enable an adjustment of the spacing between the feed rollers of each pair.

3. A swaging machine as set forth in claim 1, in which said sets of feed rollers succeeding said workpiece entrance comprise a plurality of pairs of rigidly mounted sizing rollers, said pairs of sizing rollers are arranged one behind the other,
adjacent ones of said pairs of sizing rollers are angularly spaced 90° apart, and
infinitely variable drive means are connected to said sizing rollers.

4. A swaging machine as set forth in claim 3, in which a vibrator is provided which is operable to impart high-frequency vibrations to said sizing rollers.

* * * * *